United States Patent [19]
Fischer

[11] 3,794,348
[45] Feb. 26, 1974

[54] AUTOMOTIVE VEHICLE FRAMES

[75] Inventor: Hans Karl Wilhelm Fischer, Strinz-Margaretha, Germany

[73] Assignee: General Motors Corporation, Detroit, Mich.

[22] Filed: Sept. 5, 1972

[21] Appl. No.: 286,193

[30] Foreign Application Priority Data
Sept. 27, 1971 Germany............................ 2148108

[52] U.S. Cl................................. 280/106, 52/573
[51] Int. Cl............................................. B62d 21/00
[58] Field of Search... 280/106, 106 T; 52/573, 731, 52/DIG. 5

[56] References Cited
UNITED STATES PATENTS
1,066,532   7/1913   Rohlfing.......................... 280/106 R FOREIGN PATENTS OR APPLICATIONS
1,254,029   9/1963   Germany

*Primary Examiner*—Philip Goodman
*Attorney, Agent, or Firm*—Herbert Furman

[57] ABSTRACT

An automotive vehicle frame comprising hollow longitudinal members including a forward region, a rear region, and a central region, each of said forward and rear regions having weakened areas providing lower compressive stiffness compared with that of the central region. The hollow longitudinal members may be formed from U-section channel with a cover plate secured (as by welding) to the channel to cover the open side thereof, and the weakened areas are provided by interruptions in the securement of the plate to the channel. The frame member may alternatively be formed by assembling plates together to form a hollow box-like structure. The cover plate or plates may be shaped at the weakened areas to ensure a buckling of the frame member under impact in a preferred direction.

4 Claims, 6 Drawing Figures

AUTOMOTIVE VEHICLE FRAMES

The invention relates to automotive frame members including a forward region, a rear region, and a central region, each of said forward and rear regions having weakened areas providing lower compressive stiffness compared with that of the central region.

It is an object of the invention to provide an automotive frame, which in the event of a front or rear collision of an automotive vehicle incorporating such a frame, will deform in a region which lies outside the passenger space of the vehicle, while absorbing the energy of impact from the collision through said deformation. The invention provides an economic way of achieving this object by providing an automatic frame with forward and rear regions having lower compressive stiffness than the central region of the frame, and one that is well suited for mass production.

IN THE DRAWINGS

Figure 1:
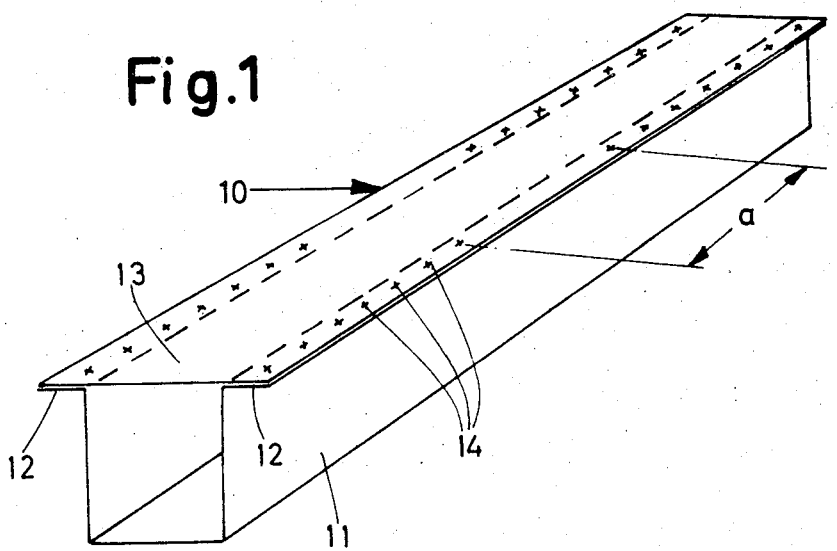
FIG. 1 is an oblique view of an end region of a frame of an automotive frame according to the invention.
Figure 2:
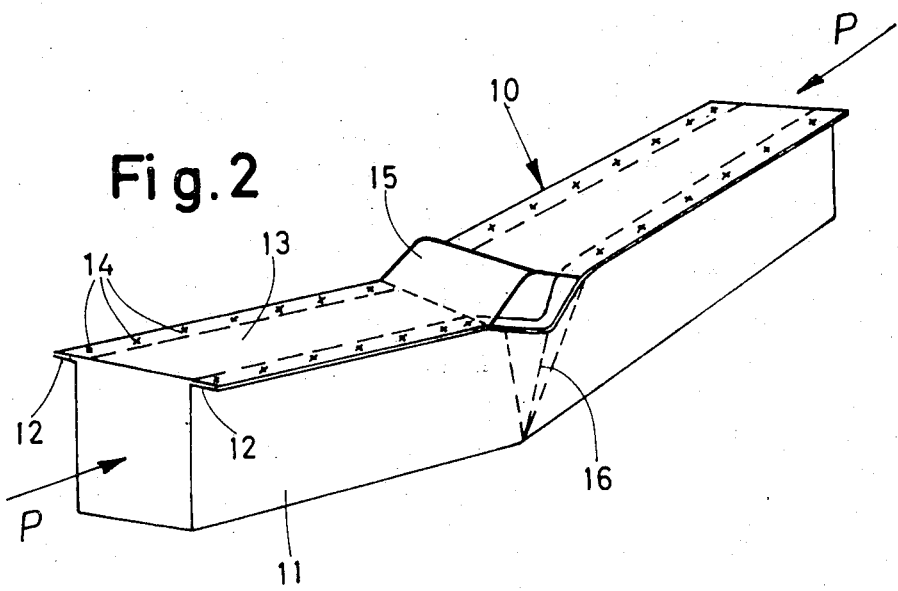
FIG. 2 shows the member of FIG. 1 deformed as the result of an impact thereon.

A motor vehicle frame according to the invention incorporates hollow longitudinal frame or side members, of which an end region of one only is shown in FIGS. 1 and 2, where it is indicated by the reference numeral 10. Since these frame members are alike one only will be described. The member 10 includes a U-shaped cross section channel member 11 with an out-turned flange 12 extending from the free end of each side or limb of the channel member. A cover plate 13 is secured to these flanges 12 and closes the open side of the channel member 11. Small crosses 14 indicate schematically that the cover plate 13 is secured to the flanges by spot welding. Individual spot welds as indicated by the crosses 14 are equally spaced one from another. The spot welds are discontinued at longitudinally spaced locations, to provide locally weakened areas of the member 10. These areas indicated by the reference letter a, (one only being shown in FIGS. 1 and 2) are at respective forward and rear regions of the member, with a fully secured central region between said regions.

In the event of an impact on the front or rear of a vehicle incorporating a frame according to the invention, each frame member would tend to buckle at the end region receiving the impact force as shown in the case of the frame member 10 in FIG. 2. Impact forces P as shown in FIG. 2 act on one or other end of the frame member 10 and tend to compress it. Because of the interruption in welding of the cover plate 13 to the flanges 12, the region a (FIG. 1) has less stiffness in compression than the the non-interrupted areas of the member, and the member tends to buckle in the area a as the result of the impact force acting on the member. As seen in FIG. 2 the unsecured portion of the cover plate 13 is deformed as at 15 and moves away from the channel member 11 which itself kinks and folds along its sides in the area a as indicated at 16 in FIG. 2, and the frame member itself tends to buckle in the area a and fold in the direction of movement 15 of the cover plate 13. This deformation of the end region of the member 10 absorbs much if not all the impact force and so the central region of the frame remains generally undeformed.

Figure 3:
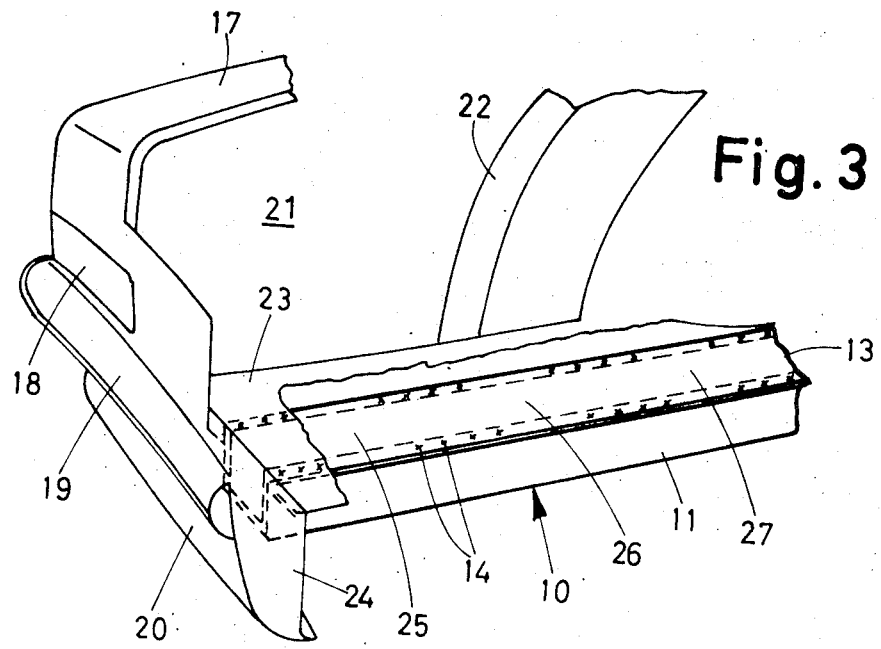
FIG. 3 is a schematic three-quarter view with parts cut away of a portion of an automotive vehicle rear end incorporating a frame according to the invention.
Figure 4:
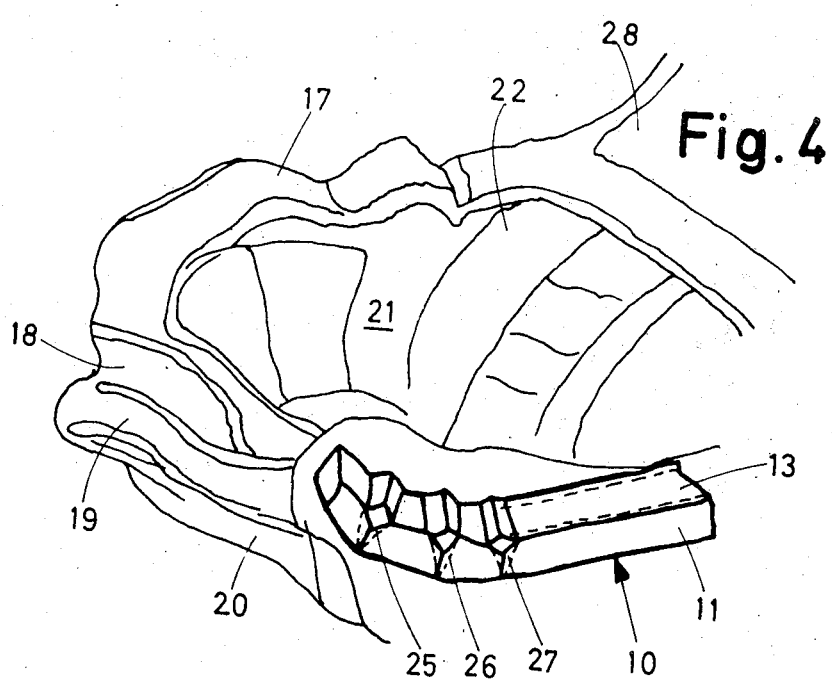
FIG. 4 is a schematic three-quarter view with parts cut away of a portion of an automotive vehicle rear end incorporating a frame according to the invention, and showing the body portion and a frame member deformed as the result of an impact thereon.

FIGS. 3 and 4 show schematically part of a rear portion 17 of an automotive vehicle incorporating a frame according to the invention and having members 10 as shown in FIGS. 1 and 2. The rear portion 17 includes rear light fittings 18 (of which one only is shown), a bumper 19, and rear end sheet metal panelling 20 defining the rear end of a compartment 21. The compartment 21 has a floor 23. A rear end region of one frame member 10 only is shown in FIGS. 3 and 4 since only a portion of the rear end is shown in the FIGS. A similar arrangement is provided at the other side of the vehicle rear end. One wheel arch 22 is indicated in FIG. 3 and a portion of the vehicle bodywork including part of a rear window 28 is shown in FIG. 4. The member 10 extends longitudinally of the vehicle beneath the floor 23 and carries at its end a support plate 24 to which the panelling 20 is secured. The member 10 has three interrupted areas 25, 26 and 27 at its rear region. FIG. 4 shows how the frame member 10 buckles at these areas 25, 26, and 27 as a result of an impact on the rear end 17 of the vehicle. Distortion of the rear end 17 of the vehicle is also shown in FIG. 4. However, the buckling of this region of the frame member 10 will have absorbed the major portion of the impact force thus preserving the vehicle passenger space (not shown) from deformation. Although only one member 10 is here referred to as having been deformed, this has been done solely for clarity of description. It will of course be understood that a like member at the other side of the vehicle would also buckle although not necessarily to the same degree as this would depend upon the direction of impact.

Figure 5:
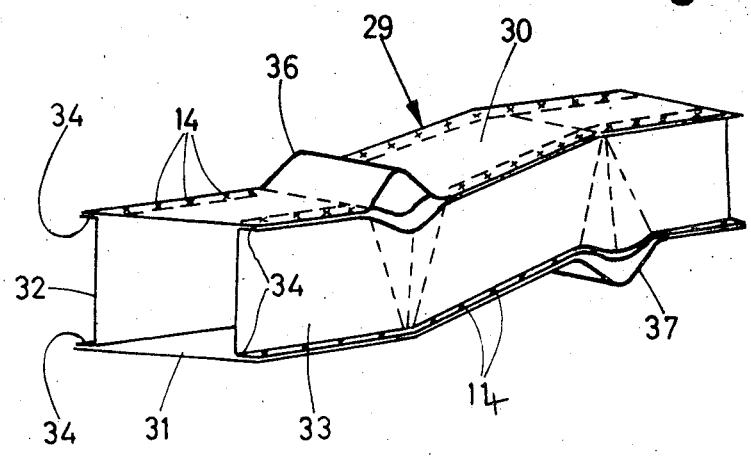
FIG. 5 is an oblique view of an end region of another embodiment of a frame member of an automotive frame according to the invention and deformed as the result of an impact thereon; and, FIG. 6 is an oblique view of an end region of another embodiment of a frame member of an automotive frame according to the invention.

FIG. 5 shows an end region of a further embodiment of a frame member 29 of a frame according to the invention. This member 29 is made by assembling together four edgewise-abutting longitudinal plates 30, 31, 32 and 33. The member 29 has a flat upper plate 30, a flat lower plate 31, and two side plates 32 and 33. Each side plate 32, 33 has out-turned flanged edges 34. As indicated by the crosses 14 the lower and upper plates are spot welded to the side plates at the flanges 34. The end region of the frame member 29 shown in FIG. 5 has interruptions in the spot welding of both the lower and upper plates to the respective flanges 34. These interruptions, of which one lower one 37 and one upper one 36 are shown in FIG. 5 are staggered or offset from one another. Thus as shown in FIG. 5 as the end region is buckled under impact it deforms in a zig-zag fashion.

Figure 6:
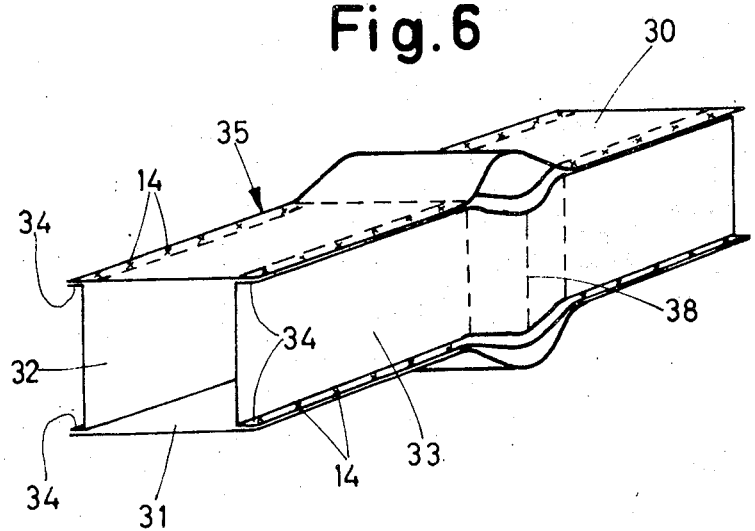

FIG. 6 shows an end region 35 of part of another embodiment of a member of a frame according to the invention. In this Figure like reference numerals indicate like parts to those of FIG. 5. In FIG. 6 the interruptions in the securement of the upper and lower plates to the flanges are not offset one from another and so when an impact force acts on the member end region 35 that end region will tend to buckle in the fashion indicated schematically at 38, with somewhat greater outward movement of the cover plates 30, 31, and the side plates 32, 33, as compared with the outward movement of the cover plates and sides of the above-mentioned embodiments.

FIG. 6 shows the cover plates as having an outward shape or curve away from the side plates in the region of the spot weld interruptions. This shaping provides a preferential bending direction for the plates when the member is deformed by impact force, and if desired a similar shaping could be utilized in the above described members.

Although only one end region has been referred to in connection with each frame member 10, 29, 35 it is to be understood that each member has such a region at each end of the member having weakened areas providing lower compressive stiffness compared with that of the central region of each member.

The spacing and number of the interruptions can be varied to suit specific design requirements to produce frames having areas providing lower compressive stiffness according to the invention without the need to make great changes in the form or dimensions of the members of such frames.

I claim:

1. An automotive vehicle frame comprising hollow box-section longitudinal members including a forward region, a rear region, and a central region, each of said forward and rear regions having weakened areas providing lower compressive stiffness compared with that of said central region; each of said members comprising a longitudinal portion of U-shaped cross-section having marginal flanges, a plate closing said U-shaped cross-section, and connections joining the edges of said plate to said flanges, the connections being interrupted at spaced locations providing said weakened areas.

2. An automotive vehicle frame comprising hollow four-sided box-section longitudinal members including a forward region, a rear region, and a central region, each of said forward and rear regions having weakened areas providing lower compressive stiffness compared with that of said central region; each of said members comprising four edgewise-abutting longitudinal plates, marginal flanges forming junction seams between adjacent plates, and longitudinal connections along said seams; said connections having, at spaced locations on opposite sides of the member, interruptions providing said weakened areas.

3. An automotive vehicle frame according to claim 2, wherein the interruptions are relatively staggered as between said opposite sides of the member.

4. An automotive vehicle frame comprising, longitudinal frame members, each having an end region of hollow box-like structure, said structure including a pair of spaced longitudinal walls, each wall being provided with a lateral flange extending longitudinally of the wall, a longitudinal wall member seating on said flanges, and means securing said wall member to said flanges, said securing means being interrupted at spaced locations longitudinally of said walls and wall member to provide locally weakened areas which permit buckling of said walls and wall member under compressive impact loads applied to said end regions.

* * * * *